Jan. 19, 1943. E. G. BORDEN 2,308,856
RECOVERY AND CONVERSION OF OLEFINIC HYDROCARBONS
Filed April 28, 1939 2 Sheets-Sheet 2

INVENTOR
Edmund G. Borden

Patented Jan. 19, 1943

2,308,856

UNITED STATES PATENT OFFICE 2,308,856

RECOVERY AND CONVERSION OF OLEFINIC HYDROCARBONS

Edmund G. Borden, Little Neck, N. Y., assignor to Cities Service Oil Company, New York, N. Y., a corporation of Pennsylvania Application April 28, 1939, Serial No. 270,556

5 Claims. (Cl. 196—10)

This invention relates to a continuous process for recovering unsaturated olefin hydrocarbon gases from normally gaseous mixtures containing substantial proportions of saturated or paraffin hydrocarbons and the conversion of the olefins into other products.

This application is a continuation-in-part of application Serial No. 84,790, filed June 12, 1936, for "Process for recovering olefin hydrocarbons."

Enormous quantities of olefin hydrocarbons are available in such mixtures as the gases produced in the cracking of hydrocarbon oils, in the coking of coal, shales and other carbonaceous materials and in the polymerization of natural and other hydrocarbon gases. However, the olefins contained in these materials are mixed with substantial proportions of paraffinic, cyclic and naphthenic hydrocarbons and hydrogen which are not suitable for use in the various manufacturing processes in which olefins are particularly desirable. For example, in the manufacture of high anti-knock gasoline from the polymerization of olefins, considerable difficulty is encountered because the olefins available in the mixtures of the type referred to above have too wide a range of characteristics and are mixed with too much paraffin, acetylene and naphthenic hydrocarbon material of similar boiling point. In polymerization processes a high percentage of hydrogen is very undesirable because it severely limits the percentage of conversion or polymerization of the unsaturated hydrocarbons, particularly the olefins. It is desirable, therefore, to have the gases substantially free of hydrogen. The presence of methane is also undesirable and tends to limit the percentage of conversion by polymerization of the olefinic hydrocarbons.

Individual olefins or relatively narrow fractions of olefins which are relatively free from saturated hydrocarbons are highly desirable for many other processes, particularly for the manufacture of organic compounds, such as alcohols, esters, etc.

The primary object therefore of the present invention is to provide a continuous process for the selective separation of olefin hydrocarbons from gaseous mixtures of the type referred to above, the fractionation of the resulting separated olefins into selected narrow fractions or separate individual compounds, and the treatment of these unsaturated hydrocarbons to manufacture chemical compounds or to polymerize them for the manufacture of motor fuels.

Another object of the invention is to provide a continuous process for the separation of individual or groups of hydrocarbon compounds from hydrocarbon gases, the absorption of the olefins in chemically reacting agents or the polymerization of the olefins under heat and pressure or with a catalyst, and the recirculation of unreacted olefins back through the process with additional olefin in carrying out the desired reactions.

A further object of the invention is the provision of a continuous process for extracting olefins from gaseous mixtures of the type referred to above by the use of selective solvents, such for example as the higher aliphatic ethers, butyl ether, amyl ether and similar compounds as well as their chlorinated products.

Accordingly, the continuous process of the present invention comprises the steps of passing cracking still gases, for example, through one or more absorption towers in countercurrent contact with a selective solvent for olefins such as isoamyl ether, the discharge of the unabsorbed paraffinic gases and hydrogen from the top of the absorber, the passage of the solvent charged with olefins from the bottom of the absorber, removal from the latter of the absorbed olefins, and the separation of various individual olefins or narrow fractions in accordance with their boiling points. The latter operations may be effectively carried out by passing the solvent and dissolved olefins into a still, vaporizing the dissolved olefins and passing them through a series of high pressure fractionating towers, from each of which a selected fraction is taken overhead.

The selective solvents preferably employed in accordance with the features of the present invention comprise the aliphatic ethers containing four or more carbon atoms to the molecule, of the type of isoamyl ether and the butyl ethers as well as the halogenated products of these ethers, particularly the dichlor products. Isoamyl ether for example, is a particularly efficient extracting agent. Other examples of this class of solvents are, dichlorisobutyl ether and dichlorisoamyl ether.

Other features and objects of the continuous process of the present invention will be apparent to those skilled in the art, from the following more detailed description thereof, taken in connection with the accompanying drawings in which.

Figure 1:
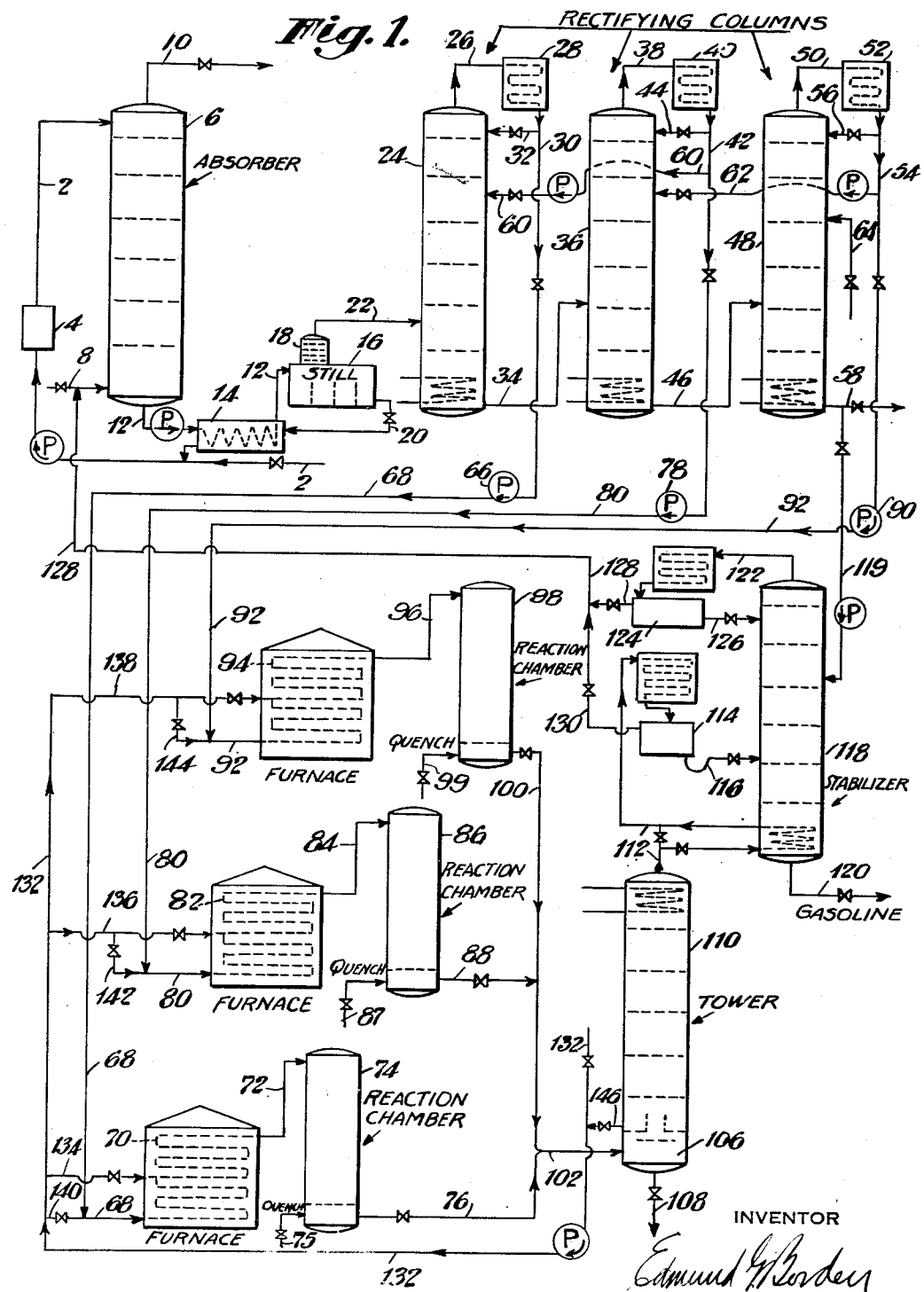
Fig. 1 is a diagrammatic showing of an assembly of apparatus elements particularly adapted for carrying out the improved process.

Referring to Fig. 1 of the drawings, the selective solvent to be used for absorbing the olefins from the gases utilized in the process is introduced into the system of the apparatus through a valved line 2 and forced by means of a pump P mounted therein, through a cooler 4 and into the upper part of an absorber 6. In the cooler 4 the solvent is preferably cooled to a temperature of from −20° C. to 25° C., depending upon the solvent and the type of gases to be extracted. The "drier" the gases, that is, the lower the boiling point of the constituents of the gas, the lower the temperature of the solvent should be, in order to provide for the heat of absorption of the olefins.

In the absorber 6 the solvent passes downwardly over a series of bubble trays countercurrent to the gases being treated which are introduced under pressure through a valved line 8. The pressure maintained in the absorber 6 may vary from 50 to 300 lbs. per square inch, the higher pressures being used for the treatment of the relatively drier gases. As the solvent passes downwardly through the absorber it selectively absorbs or dissolves the olefins from the gaseous mixture without taking up any substantial proportion of the paraffin hydrocarbons and hydrogen contained in the gases. The unabsorbed paraffins and hydrogen which may contain traces of undissolved olefins are discharged from the absorber 6 through a valved line 10.

In cases where the gas being treated contains a comparatively large amount of gaseous products, such as methane, ethane, hydrogen, nitrogen and carbon dioxide, it may be desirable to separate gases such as methane, hydrogen, carbon dioxide and nitrogen by passing the gases through an absorber (not shown) in contact with an oil absorbing menstruum such as a gasoline, kerosene or neutral oil. This oil absorption will take out practically all of the hydrocarbons both saturated and unsaturated allowing the hydrogen, nitrogen and carbon dioxide to pass on and by careful control of pressures and temperatures the methane can thus be selectively separated. The mixture then containing the saturated and unsaturated hydrocarbons, after release from the oil menstruum, is treated in accordance with the present invention in order to selectively separate the olefinic hydrocarbons from the remaining hydrocarbons in the gas.

The solvent reaching the bottom of the absorber 6 and which is substantially saturated with olefins, is withdrawn through a line 12 and forced by means of a pump mounted therein through a heat exchanger 14, and discharged into a still 16. The pressure in the still 16 may be maintained somewhat in excess of that used in the absorber 6 in order to provide a suitably high superatmospheric pressure in subsequent portions of the apparatus. This still is provided with a dephlegmator 18 which serves to eliminate from the olefin vapors driven off in the still any proportion of the solvent which may be vaporized or occluded. The still 16 is also provided with a series of overflow baffles so that the solvent, heated to successively higher temperatures as it passes through the still, will contain gradually decreasing proportions of olefin hydrocarbons. The stripped solvent is discharged from the still 16 through a valved line 20 and passed through heat exchanger 14 and then into line 2 by which it is conducted back to the absorption or extraction operation carried out in the absorber 6.

The olefin vapors evolved in the still 16, may, in a particular instance, such as in the treatment of cracking still gases, contain ethylene, propylene, the butylenes and some amylenes. This mixture of olefins is conducted from the still 16 through a vapor line 22 and introduced into a first column 24 of a series of rectifying columns, in which the mixture is fractionated under high pressure for the purpose of separating out the ethylene from the remaining constituents. In the various rectifying columns the mixtures are fractionated in accordance with the boiling point of the desired overhead products, which may correspond to the boiling points of the individual olefins or to certain classes of olefins, such for example, as the butylenes.

The temperature gradient in the rectifying column 24 is controlled in relation to the pressure maintained therein (by providing a suitable heating coil in the base of the column) so that ethylene is discharged as a gas or vapor through a vapor line 26, condensed by refrigeration in a condenser 28, and passed into a line 30 from which the condensate may be sent to a receiver, or, as hereinafter described, to a polymerization zone. Instead of condensing the ethylene discharged through the line 26, it may be used directly in gas or vapor form in any manufacturing process such as a polymerization operation carried out at high temperature and pressure for the manufacture of anti-knock gasolines and aromatic hydrocarbons. When the ethylene is condensed, any portion of the condensate may be returned as reflux to the top of the column 24 by means of a valved line 32 connecting line 30 with the top of the column 24. Instead of returning reflux to the top of the column 24 a refrigerating coil may be used in the top of the column to provide the necessary amount of refluxing.

The olefin mixture containing the compounds of higher boiling point than ethylene, are collected in the base of the column 24 and withdrawn through a valved line 34, and introduced into the midportion of a second rectifying column 36. In this column the conditions are so regulated that the propylene is fractionated out and driven overhead through a vapor line 38, and it may be used in vapor form or condensed in a condenser 40 from which the liquid condensate is conducted by a line 42 for further treatment or to storage. Any portion of this condensate may be introduced as reflux into the column 36 through a valved line 44 connecting with the line 42.

The higher boiling olefin mixture still remaining in column 36 and which gravitates to the bottom thereof, is withdrawn under reduced pressure through a valved line 46 and passed into a third rectifying column 48. In this column the pressure and temperature conditions are controlled so as to fractionate out the butylenes, or a butylene fraction, which is driven overhead through a vapor line 50 and condensed in a condenser 52. The vapors in the line 50 (and line 38) of course may be used directly without subjecting them to condensation. The liquid butylene product from condenser 52 is conducted for use or storage through a valved line 54 and any desired part of this may be used for reflux in the column 48 by passing it through a valved connecting line 56. Instead of returning reflux condensate to any one of these fractionating columns, refrigerating or cooling coils may be used to produce the desired amount of reflux in the top of the column, and heating coils may be used in the base of each column.

The remaining product which gravitates to the bottom of the column 48 may comprise substantially only the amylenes in the particular example mentioned above, and this material is withdrawn to storage or for use through a valved line 58. The product withdrawn from the bottom of column 48 may be further fractionated if found desirable, and accordingly any number of additional rectifying columns may be employed without departing from the spirit and scope of the present invention.

If the proportion of some of the olefinic compounds is comparatively large, or when the boiling points of the products are quite close together, it is often important to have a careful fractionation of the products in order to secure substantially pure fractions or compounds. In case it is desirable to carry out a fractionation to get a more complete separation of the individual olefins than can be obtained with the ordinary bubble cap distillation, then a concentration of product in a bubble column having a boiling point slightly higher than the boiling point of the product to be recovered may be built up in the fractionating columns in order to assist in the fractionation. To build up the concentration of the propylene, for example, in column 24, a portion of the product may be taken from the line 42 through a line 60 and transferred by means of a pump mounted therein into the upper midportion of the column 24. By this means the concentration of the propylene in the column 24 may be built up to an unusual extent in order to assist in carefully fractionating out all of the ethylene passing into the column 24.

To assist in removing all of the propylene by means of the fractionating column 36, a portion of the product may be removed from the line 54 through a line 62 and forced by means of a pump mounted therein into the upper midportion of the column 36. By this means one or more butylene compounds may be returned to the column 36 to assist in driving the propylene overhead. The separation of the butylene by means of the column 48 may be assisted by using a slightly higher boiling product from an outside source which is forced through a line 64 into the upper midportion of the column 48. If necessary a small column may be connected with the line 58 by which the product passing through the line 58 may be fractionated and one of the lighter fractions returned to the midportion of column 48.

In the specific example considered above, for the extraction of olefins from cracking still gases, a pressure of approximately 150 lbs. per square inch may be maintained in absorber 6, about 250 lbs. per square inch in column 24, about 190 lbs. per square inch in column 36, and about 50 lbs. per square inch in column 48. With the use of these pressures, the temperatures in the rectifying columns will be controlled to effect the desired fractional separation as outlined above.

The individual olefins or fractions produced by the rectification operations in the columns 24, 36 and 48 may be polymerized under heat and pressure for the production of higher boiling products particularly those boiling in the motor fuel range. For example, the ethylene conducted through the line 30 may be passed at a pressure of from 400 to 700 lbs. per square inch by means of a pump 66 and a line 68 to a polymerizing coil 70 mounted in a pipe still furnace. In passing through the coil 70, the ethylene may be polymerized by applying a high temperature of from 950° to 1350° F., depending upon the reaction time, after which the products are discharged through a transfer line 72 into the upper portion of an enlarged reaction chamber 74 in which the highly heated products are permitted to react for an extended period of time to produce polymerization products. The temperature and rate of flow of vapors through the reaction chamber 74 are controlled so that the reaction is completed by the time the vapors reach the outlet from the chamber. At this point the vapors are rapidly cooled by spraying a quench fluid such as a light oil distillate or water into the vapors from a valved line 75. The resulting cooled vapors are thereafter conducted for subsequent fractionation through a valved line 76.

The propylene produced by the fractionating in column 36 may likewise be subjected to thermal polymerization by conducting the recovered propylene or propylene fraction from the line 42 through a pump 78 at a pressure of about 350–600 lbs. per square inch, through a line 80, by which the propylene is conducted to a polymerizing coil 82, mounted in a pipe still furnace. The propylene passing through the coil 82 is preferably heated to a temperature of from 900° to 1250° F., depending on the reaction time, and then discharged through a transfer line 84, into an enlarged vertical reaction chamber 86, where the propylene or products discharged from the coil 82 are permitted to polymerize while slowly passing downwardly through the chamber. The hot reaction products are quickly cooled by a fluid injected through a valved line 87 in the same manner as for chamber 74. The resulting polymerization products, together with unconverted propylene, are then discharged from the chamber 86 through a valved line 88, for subsequent fractionation.

The butylene, butylene fraction, or butylenes, recovered from the tower 48 in the line 54 may be subjected to thermal polymerization in a manner similar to that described above in connection with the propylene and ethylene by forcing the material in the line 54 at a pressure of from 300 to 600 lbs. per square inch, by means of a pump 90 and a line 92, into a polymerization coil 94 mounted in a pipe still furnace. In this coil the fraction from the tower 48 is subjected to polymerizing temperatures of the order of 850° to 1100° F., depending upon the reaction time, and then conducted through a transfer line 96 into a reaction chamber 98 wherein the highly heated products are permitted to react for an extended period of time sufficient to produce liquid products of higher boiling point than butylene. The resulting reaction products are quenched like those in chamber 74 by introducing a cooling fluid through a valved line 99, and then discharged through a valved line 100 for subsequent fractionation.

The highly heated conversion products conducted from the polymerization operations by lines 76, 88 and 100 may be separately fractionated if desired, but they are conveniently handled by combining them in a vapor line 102 in which they preferably have a temperature of from 600° to 700° F. The resulting mixture is conducted into a separating chamber 106 where any liquefied products are permitted to separate out for removal through a valved line 108. The remaining vapors preferably at a temperature of about 650° F. are conducted into a fractionating tower 110, above the chamber 106, and subjected to rectification to condense all constituents of higher boiling point than those desired in the gasoline or motor fuel product. This rectification may be aided by a cooling coil in the upper part of the tower 110.

The vapors and gases remaining uncondensed in the tower 110 are conducted through a vapor line 112, condensed in a condenser, and the resulting condensate and uncondensed gases passed to a receiver 114. The receiver 114 is maintained under a superatmospheric pressure of from 225 to 250 lbs. per square inch, which pressure is also maintained in tower 110 from the higher pressures in the reaction chambers. The gas separated out therefore in receiver 114 will be substantially "dry" and the condensate will contain considerable proportions of $C_4$, $C_3$ and $C_2$ hydrocarbons. This material is stabilized by conducting it from the receiver 114 through a valved line 116 into a stabilizer 118 operated to produce a gasoline of desired vapor pressure and eliminate overhead the $C_2$, $C_3$ and undesired proportions of the $C_4$ hydrocarbons.

The product withdrawn from rectifying tower 48 through line 58 is a very desirable motor fuel constituent and is therefore preferably passed through a valved line 119 by means of a pump mounted therein and introduced into the upper midportion of the stabilizer 118 to aid in the rectification therein and to blend the product with the gasoline normally produced by the stabilizer. The desired bottom temperature in the stabilizer may be maintained by heat derived from the vapors in line 112 by using a heat exchanger as illustrated in the drawings. The gasoline product produced in the stabilizer is withdrawn through a valved line 120.

The overhead vapors and gases removed from the stabilizer 118 are passed through a vapor line 122 and a condenser to produce sufficient condensate for refluxing the upper part of the stabilizer, the resulting condensate and uncondensed gases being directed to a receiver 124, from which the reflux liquid is introduced into the stabilizer through a valved line 126. Only sufficient of the vapors passing through the line 122 is condensed to provide the required reflux ratio in the stabilizer 118. The gases in the receiver 124 are removed through a line 128 and passed into the line 8 leading to the absorber 6. The gases from the receiver 114 may also be sent to the absorber 6 by means of a valved line 130 which discharges into the line 128. A pressure of about 170 lbs. per square inch is maintained in the receiver 124 and stabilizer 118.

The present invention may advantageously include the simultaneous polymerization of olefin hydrocarbons as described above, along with the cracking of hydrocarbon oils. As an example, the hydrocarbon oil such as gas oil may be introduced into the apparatus shown in Fig. 1 through a line 132 and forced at a suitably high pressure by means of a pump mounted therein into the coils 70, 82 and 94. The oil to be cracked in each of these coils may be introduced into the midportion of each coil, at a point where the gas has reached a relatively high temperature, through suitable valved branch lines 134, 136 and 138 respectively. If desired, the oil may be introduced to the inlet of each of the respective furnaces through valved branch lines 140, 142 and 144, or at both points. The proportion of oil introduced into any one of the coils 70, 82 or 94, is preferably not greater than the weight of gas introduced into the same coil. The introduction of the oil into the midportion of the coil is preferred because it provides a convenient method of instantaneously vaporizing the oil so that it is cracked in the remainder of the coil, and the reaction chamber associated therewith, while it is in the vapor phase. Where the coils 70, 82 and 84 are used for the combined polymerization of olefins and the cracking of hydrocarbon oils, the temperatures of the products discharged from the coils should not be raised above 1100° F. This may to some extent decrease the proportion of olefin polymerization obtained, from that secured for example at higher temperatures, particularly where ethylene and propylene are involved. However, the combined treatment of hydrocarbon oil and olefins provides an operation in which the vapor pressure of the desired unsaturated hydrocarbons may be built up in the product passing through the cracking coil in order to promote the desired reaction, and thus produce the product desired. For example, if it is desired to increase the concentration of benzol, this can be accomplished by increasing the percentage of higher boiling olefins. On the other hand, alkylated benzol may be formed by controlling the percentage composition of the ethylene, propylene or butylenes passed to the respective coils 70, 82 and 94.

The reflux condensate formed in the tower 110 which may contain gas-oil and some lighter constituents, is preferably withdrawn through a valved line 146 into the line 132 and sent to the conversion coils 70, 82 and 94. The cooling fluid introduced through the lines 75, 87 and 99 preferably is a hydrocarbon oil which will be substantially completely vaporized in the lower portion of the reaction chambers while it produces the desired cooling. Gases containing olefins may also be used as a cooling medium in the lines 75, 87 and 99, since they eventually would reach the absorber 6 by way of lines 128 and 130.

Instead of polymerizing the individual olefins or fractions produced by the columns 24, 36 and 48, by heat and pressure (thermal polymerization) or by combining their polymerization with the cracking or conversion hydrocarbon oils, as described in connection with Fig. 1 of the drawings, the olefinic compounds or individual fractions produced by the columns 24, 36 and 48, may be polymerized with a suitable catalyst by utilizing the apparatus shown in Fig. 2 of the drawings. In this figure of the drawings, the selective absorption, recovery and fractionation of the olefin hydrocarbons to be polymerized is identical with that described in connection with Fig. 1, and the apparatus elements involved in these steps are designated by the same reference characters.

Figure 2:
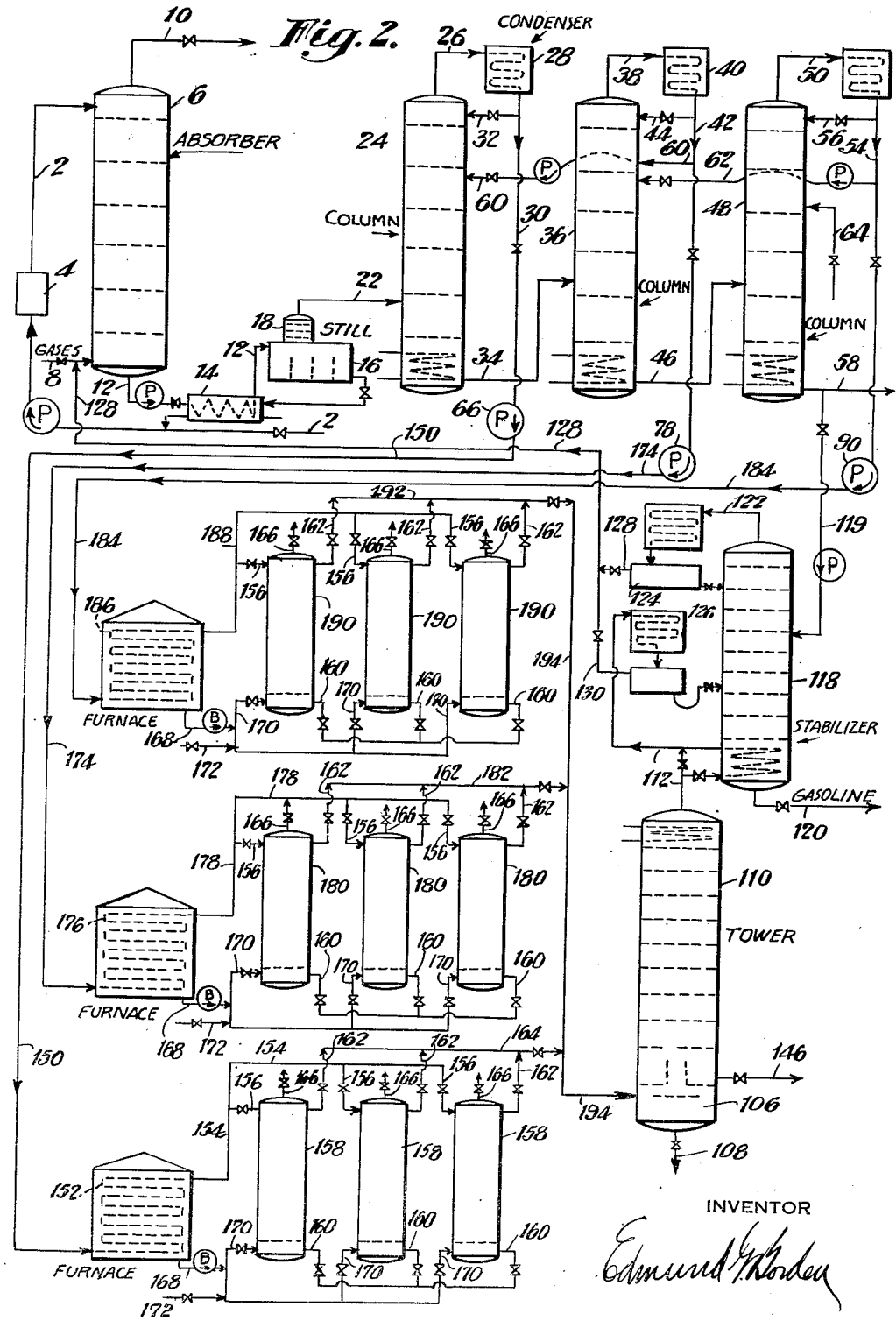
Fig. 2 is a diagrammatic showing of a modified assembly of apparatus elements for carrying out a modified form of the improved process.

Therefore, referring to Fig. 2 of the drawings, the ethylene recovered in the line 30 is passed by means of pump 66 through a line 150 and a heating coil 152 mounted in a pipe still furnace. In this coil, the ethylene is preferably heated under a pressure of about 500 to 750 lbs. per square inch to a discharge temperature of from 375° to 800° F., after which it is passed into a distributing line 154 from which it is conducted, preferably with 0.1 to 0.5° of oxygen or water as an accelerator, through one of three alternate valved lines 156, into the upper portion of one of three alternate catalyst polymerization chambers 158. Each chamber is preferably filled with a catalytic material such as alumina or phosphoric acid deposited on some porous carrier or intimately mixed with such porous carrier which may be cast into desired relatively small shapes. The ethylene is preferably passed through two of the chambers in series while the other catalyst chamber is cut out of the system and the catalyst revivified. The ethylene therefore introduced into the upper portion of one of the chambers 158 passes downwardly through the catalyst therein, through two of three alternative valved lines 160, into the bottom of one of the remaining chambers, and upwardly through the body of catalyst therein. The ethylene in passing through the catalyst in two of the chambers is preferably maintained at a pressure of approximately 500 lbs. per square inch and undergoes considerable polymerization to hydrocarbons which are liquid at normal temperatures. The resulting products are discharged from the last of the two contact chambers through one of three alternate valved lines 162, into a valved collecting line 164.

The catalyst chamber 158 which is cut out of the circuit for revivification of the catalyst is isolated by closing the valves in lines 156, 160 and 162 leading thereto. Before closing the valve 162 the products which would normally remain in the chamber 158 upon closing valves 156 and 160 may be replaced and forced out into the line 164, or vented to suitable receiving apparatus through a valved vent line 166. In any case, when the isolated chamber is ready for revivification of the catalyst the vent line 166 is opened and hot products of combustion for example from the pipe still furnace is forced through a line 168 by means of a pump or blower (B) mounted therein, through an appropriate valved branch line 170 and used to revivify the catalyst along with a suitable proportion of air introduced through a valved line 172. After the catalyst in the isolated chamber has been revivified, it is purged to remove oxygen and then the valves in lines 166 and 170 are closed and the chamber put back into the polymerization cycle, preferably as the last in series of the two catalytic chambers being used to polymerize the ethylene. The three chambers 158 may therefore be used so that two chambers are in the cycle, and while the other chamber is cut out of the system for revivification of the catalyst therein.

The propylene fraction removed from the tower 36 through the line 42 is forced by means of pump 78 at a pressure of from 400 to 600 lbs. per square inch through a line 174 and a heating coil 176 mounted in a pipe still furnace, and therein heated to a temperature of from 350° to 700° F. The resulting hot propylene is conducted through a distributing line 178, preferably with from 0.1 to 0.5% of oxygen or water as an accelerator, and subjected to catalytic polymerization in catalyst chambers 180 containing, for example, zinc chloride or phosphoric acid on a carrier, by a procedure identical with that described in connection with ethylene and chambers 158. The various connecting lines for the alternate operation of chambers 180 are designated by the same numerals as those applied to the corresponding lines of chambers 158. The products resulting from the polymerization of the propylene fraction are discharged into a valved collecting line 182 for subsequent fractionation. A pressure of approximately 350 to 500 lbs. per square inch, is preferably maintained in the catalyst chambers 180 during the polymerizing operation.

The butylene compound or fraction recovered overhead from the tower 48 and removed through the line 54, is conducted under a pressure of from 375 to 500 lbs. per square inch by means of pump 90 and passed through a line 184 and a heating coil 186 mounted in a pipe still furnace, and therein heated to a temperature of from 265° to 400° F. The resulting heated butylene or fraction is passed through a distributor line 188, along with 0.1 to 0.5% of oxygen or water, to the upper portion of one of three catalyst chambers 190. These chambers preferably contain orthophosphoric acid on diatomaceous earth, are operated in exactly the same manner as the chambers 158 and all of the connecting lines are designated by the same reference numerals as those connected with chambers 158. The polymerization product resulting from the polymerization of the butylene in the chambers 190 is collected in a valved line 192 for subsequent fractionation.

The products produced by the polymerizing operations carried out in chambers 158, 180 and 190, are passed through lines 164, 182 and 192, into a vapor-collecting line 194, and subjected to fractionation in equipment identical with that shown and described in connection with Fig. 1 of the drawings, by the passage of the vapors from the line 194 into the separating chamber 106 and the subsequent apparatus elements shown.

In carrying out the polymerization of the olefins in chambers 158, 180 and 190, there is an exothermic temperature rise above that of the temperature of the gas introduced. For ethylene the temperature rise in the first chamber is about 110° F., and in the second chamber about 25° F. For propylene, the corresponding temperature rises are slightly lower, that is, about 100° F. for the first chamber, and about 20° F. for the second chamber. The butylene fraction produces an exothermic temperature rise of about 85° in the first chamber and about 15° in the second chamber.

Various other catalysts may be employed in the chambers 158, 180 and 190, such for example as aluminum chloride, zinc chloride, phosphoric acid, silica gel, iron phosphates and alumina. Other aluminum halides may be used, for example, aluminum bromide is a very powerful catalyst. Any of these catalysts may be deposited on a carrier material.

Various modifications may be made in the operation of the apparatus shown in Fig. 2, and in the polymerization steps. For example, a certain proportion of propylene may be subjected to polymerization with the butylene, but ordinarily the propylene content of the charging stock should not exceed about one third of the butylenes. Similarly, a small percentage such as 10% of ethylene, may be included in the propylene stock for the coil 176. These small percentages of lower olefins may be polymerized with higher olefins, but as a general rule, as mentioned above, entirely different conditions must be maintained for effective polymerization of the various olefins. The operations carried out in chambers 158, 180 and 190, never completely polymerize the entire charging stock, so that there is always certain unreacted gases as well as the production of other gases both saturated and unsaturated in the products from these chambers. These materials are recovered as described in detail in connection with the apparatus shown in Fig. 1, and sent back to the absorber 6 for segregation of the olefins which are recycled in the process.

The importance of the process of the present invention may be readily appreciated from the fact that a mixture of olefins cannot be successfully converted by polymerization into high antiknock gasoline without destroying a large part of the olefins. The temperature and pressure conditions for the thermal polymerization of ethylene for example, are entirely unsuited for the thermal polymerization of the butylenes. However, according to the present invention, these various olefins may be effectively separated from the paraffins, separately recovered and utilized individually in a very economical manner. The separation of the olefins from the paraffins is very important because of the fact that the paraffins are not polymerized under the conditions of the process, and tend to enter into other reactions and act as diluents. The paraffins in gas mixtures therefore actually hinder the proper utilization of the olefins contained in such mixtures.

By carefully fractionating and separating the different olefinic products these products may be placed in suitable condition so that they may be readily nitrated or sulfated to form their corresponding hydrates, nitrates and sulfates, and these products then treated to make alcohols and esters. By carefully fractionating the products the desired end product can be formed directly and a very substantial saving made in the final refining of the product. Where a mixture of different olefins is treated with acids, the reaction cannot be as accurately controlled as where single products are converted into esters and alcohols. Furthermore, the percentage conversion of the products may be very much higher and thus avoid loss due to secondary reactions or the formation of constant boiling mixtures or interaction between various intermediate products.

From the foregoing description, it is readily apparent that various modifications may be made in the process of the present invention without departing from the spirit of the invention.

Having thus described the invention in its preferred form, what is claimed as new is:

1. In the production of motor fuels in which an olefin gas is polymerized into normally liquid constituents boiling within the gasoline range, the improvement which comprises passing a gaseous mixture containing olefinic $C_2$, $C_3$ and $C_4$ hydrocarbons in intimate contact countercurrent to a selective solvent for the olefin hydrocarbons of said mixture comprising a member of the group consisting of alkyl ethers and dichlorides of alkyl ethers in which each alkyl radical contains four or more carbon atoms, selectively absorbing the olefins from said gaseous mixture into said solvent, passing the solvent containing the absorbed olefins into a still and separating the olefins from the solvent to produce a vapor mixture containing $C_2$, $C_3$, and $C_4$ olefinic hydrocarbons which is substantially free of paraffin hydrocarbons, subjecting the mixture of olefin vapors from said still to a series of high pressure rectifying operations to produce separate olefin fractions containing respectively essentially only $C_2$, $C_3$ and $C_4$ olefins, separately subjecting said fractions to polymerization in individual polymerizing zones maintained under controlled conditions of temperature and pressure particularly adapted to polymerize the separate fractions into hydrocarbons of higher molecular weight, recovering the normally liquid polymers produced from said fractions and recycling the unreacted olefins back through the absorption steps of the process.

2. The process of making organic compounds from olefinic hydrocarbon gases, which comprises contacting a gaseous mixture containing hydrogen, paraffinic hydrocarbons, and $C_2$, $C_3$ and $C_4$ olefinic hydrocarbons with a selective solvent adapted to selectively absorb the olefinic hydrocarbons from the gaseous mixture, separating the absorbed olefin hydrocarbons from the selective solvent as a mixture containing $C_2$, $C_3$ and $C_4$ olefins which is substantially free of paraffin hydrocarbons, passing the resulting olefin mixture into a first rectifying zone and therein producing an overhead olefin fraction comprising substantially only ethylene, passing the remainder of the olefin mixture from said first rectifying zone to a second rectifying zone in which an overhead fraction comprising essentially only propylene is produced, rectifying the remainder of the olefin mixture in a third rectifying zone and producing an overhead fraction comprised essentially only of $C_4$ olefins, separately subjecting said overhead olefin fractions from said rectifying zones to separate conversion operations under controlled conditions of temperature and pressure particularly adapted for the conversion of each olefin fraction into organic compounds of higher molecular weight, recovering the organic compounds produced by said conversion operations and recycling the unreacted normally gaseous hydrocarbons from each of said conversion operations back through the absorption steps of the process for retreatment.

3. The process of making organic compounds from olefin hydrocarbon gases, which comprises contacting a gaseous mixture containing hydrogen, paraffinic hydrocarbons and $C_2$, $C_3$ and $C_4$ olefinic hydrocarbons with a selective absorbent solvent adapted to selectively absorb the olefin hydrocarbons from the mixture and thereby separate them from the remaining constituents of the mixture, carrying out said contacting operation under controlled conditions of temperature and pressure particularly adapted for effecting said absorption, separating the absorbed olefins as a mixture from the selective solvent, passing the separated olefin mixture through a series of fractionating columns and fractionating out individual olefin fractions comprised respectively of essentially only $C_2$, $C_3$ and $C_4$ olefinic hydrocarbons, passing said olefin fractions to separate polymerizing zones, each including a heating coil, wherein each fraction is polymerized to produce organic compounds of higher molecular weight under conditions particularly adapted for the polymerization of each individual fraction, introducing petroleum oil at an intermediate point into the coil of each zone and cracking it simultaneously with the olefin subjected to polymerization therein, collecting the normally condensible products resulting from said separate cracking coil operations and recycling the gaseous hydrocarbons from said cracking coil operations back through the absorption step of the process for retreatment.

4. The process of making organic compounds condensible under normal conditions of temperature and pressure from olefinic hydrocarbon gases, which comprises intimately contacting a gaseous mixture containing hydrogen, paraffinic hydrocarbons, and $C_2$, $C_3$ and $C_4$ olefinic hydrocarbons with a selective solvent in a contact zone, said solvent being adapted to selectively absorb the olefinic hydrocarbons from the gaseous mixture and thereby separate the olefins from the remaining constituents of the mixture, separating the absorbed olefins from the solvent as a mixture which is substantially free of paraffin hydrocarbons, subjecting the resulting mixture of olefins to a series of rectifying operations to produce olefin fractions comprising respectively essentially only $C_2$, $C_3$ and $C_4$ olefinic hydrocarbons, passing each of said olefin fractions produced by said rectifying operations through an individual polymerizing zone maintained under conversion conditions adapted to convert the olefin fractions into higher molecular weight organic compounds by polymerization, carrying out said polymerization operations under controlled conditions of temperature and pressure to favor the production of polymers from said olefins, recovering the normally condensible organic compounds produced by said polymerization operation and recycling for retreatment in the contact zone of the process any gaseous hydrocarbons remaining from the products removed from said polymerizing zones.

5. The process of making organic compounds from olefin hydrocarbon gases, which comprises contacting a gaseous mixture containing hydrogen, paraffinic hydrocarbons and $C_2$, $C_3$ and $C_4$ olefinic hydrocarbons with a selective absorbent solvent adapted to selectively absorb the olefin hydrocarbons from the mixture and thereby separate them from the remaining constituents of the mixture, carrying out said contacting operation under controlled conditions of temperature and pressure particularly adapted for effecting said absorption, separating the absorbed olefins from the selective solvent, passing the separated olefin mixture through a series of fractionating columns and fractionating out individual olefin fractions comprised respectively of essentially only $C_2$, $C_3$ and $C_4$ olefinic hydrocarbons, passing said olefin fractions to separate polymerizing zones, each including a heating coil, wherein each fraction is polymerized to produce organic compounds of higher molecular weight under conditions particularly adapted for the polymerization of each individual fraction, passing the conversion products from said zones to a common fractionating tower and therein fractionating out constituents of higher boiling point than gasoline as reflux condensate, introducing portions of said reflux condensate into the coil of each polymerizing zone and cracking it simultaneously with the olefins subjected to polymerization therein, fractionating the remaining vapors including the gasoline constituents from said fractionating tower to condense the normally condensible products including the gasoline boiling range constituents, and recycling the gaseous hydrocarbons from said fractionating operations back through the absorption step of the process for retreatment.

EDMUND G. BORDEN.